United States Patent
Momonami

[19]
[11] Patent Number: 6,031,635
[45] Date of Patent: Feb. 29, 2000

[54] FACSIMILE APPARATUS

[75] Inventor: Shinichi Momonami, Nara, Japan

[73] Assignee: Sharp Kabushiki Kaisha, Osaka, Japan

[21] Appl. No.: 08/768,134

[22] Filed: Dec. 17, 1996

[30] Foreign Application Priority Data

Dec. 20, 1995 [JP] Japan .................................. 7-331661

[51] Int. Cl.$^7$ .................................................. H04N 1/00
[52] U.S. Cl. ............... 358/434; 379/100.05; 379/100.06; 379/100.09; 379/100.12
[58] Field of Search ...................... 358/400, 402, 358/404, 407, 434, 436–438, 440, 444; 379/100.01, 100.04, 100.05, 100.06, 100.09, 100.12, 102.02, 102.03, 355

[56] References Cited

U.S. PATENT DOCUMENTS

| | | | |
|---|---|---|---|
| 4,447,676 | 5/1984 | Harris et al. ...................... | 179/90 BD |
| 4,769,835 | 9/1988 | Hirth et al. ...................... | 379/355 |
| 4,870,678 | 9/1989 | Adachi ............................ | 379/100 |
| 4,935,955 | 6/1990 | Neudorfer ........................ | 379/100 |
| 5,210,621 | 5/1993 | Kinoshita ........................ | 358/440 |
| 5,339,357 | 8/1994 | Sawamura et al. ................. | 379/355 |
| 5,428,457 | 6/1995 | Okumura et al. .................. | 358/403 |
| 5,636,034 | 6/1997 | Ishikawa ......................... | 358/434 |
| 5,884,148 | 3/1999 | Bilgic et al. .................... | 455/74.1 |

FOREIGN PATENT DOCUMENTS

| | | | |
|---|---|---|---|
| 1 245 380 | 11/1988 | Canada ......................... | H04M 11/00 |
| 5-219275 | 8/1993 | Japan . | |

OTHER PUBLICATIONS

Patent Abstracts of Japan, vol. 096, No. 004, Apr. 30, 1996 & JP 07 336474 A (Ricoh Co. Ltd.), Dec. 22, 1995 *abstract*.

Primary Examiner—Jerome Grant, II
Attorney, Agent, or Firm—Nixon & Vanderhye P.C.

[57] ABSTRACT

A facsimile apparatus capable of simultaneously being connected to a plurality of lines, which allows, with improved usability of the lines, dialing by the operator or automatic control by the apparatus over an idle line of the plurality of lines in cases where the apparatus has already been connected to another apparatus, for communication or operation for establishing a communication by accessing or being accessed from another apparatus and includes a comparison device for comparing a first subscriber number of a previously connected end and a second subscriber number of an end which will be dialed, and a controller for controlling the dialing operation when the comparison device finds that the first and the second subscriber numbers are identical.

18 Claims, 7 Drawing Sheets

FACSIMILE APPARATUS

BACKGROUND OF THE INVENTION

1. Field of the Invention

The present invention relates to a family of communications equipment having a plurality of lines, and more particularly to a facsimile apparatus.

2. Description of the Related Art

The prior art techniques for facsimile apparatuses include the one described in Japanese Unexamined Patent Application Disclosure HEI 5-219275, for example. Dual communication facsimile apparatuses as disclosed therein may be efficiently used, since the two lines may be used individually for transmission and reception at the same time.

However, even with such dual communication facsimile apparatuses which allow conversation and/or facsimile transmission to be performed individually over two lines, a busy signal is produced whenever the telephone is dialed for additional conversation or facsimile transmission with the same end over a second line if a first line has already been occupied due to conversation or facsimile transmission.

Here, the operator must wait until the receiver is freed from the busy state when the operator dials, whereas when the telephone is automatically controlled, it must be ready for redialing, which may result in the second line being reserved and prevent the line from being operated otherwise.

It is an object of the present invention to provide a facsimile apparatus with increased usability, which is designed so that the dialing operation is controlled to increase the usability of the facsimile apparatus when the receiver, which has been connected for conversation or facsimile transmission over a first line, is attempted to be additionally connected for separate conversation or facsimile transmission over a second line.

SUMMARY OF THE INVENTION

In order to accomplish the object, the invention provides a facsimile apparatus capable of simultaneously being connected to a plurality of lines, which allows dialing by the operator or automatic control by the apparatus over an idle line of the plurality of lines in cases where the apparatus has already been connected to another apparatus for communication or an operation for establishing a communication, by accessing or being accessed from another apparatus.

The apparatus includes a comparison device for comparing a first subscriber number of a previously connected end and a second subscriber number of an end which will be dialed; and a controller for controlling a dialing operation when the comparison device finds that the first and the second subscriber numbers are identical.

The controller of the above facsimile apparatus suspends dialing until the previously established communication or operation for establishing a communication is terminated, and the connected line is freed.

The controller of the above facsimile apparatus is further able to terminate the dialing operation.

BRIEF DESCRIPTION OF THE DRAWINGS

Other objects, features, and advantages of the invention will be more explicit from the following detailed description taken with reference to the drawings wherein.

DETAILED DESCRIPTION OF THE PREFERRED EMBODIMENTS

Figure 1:
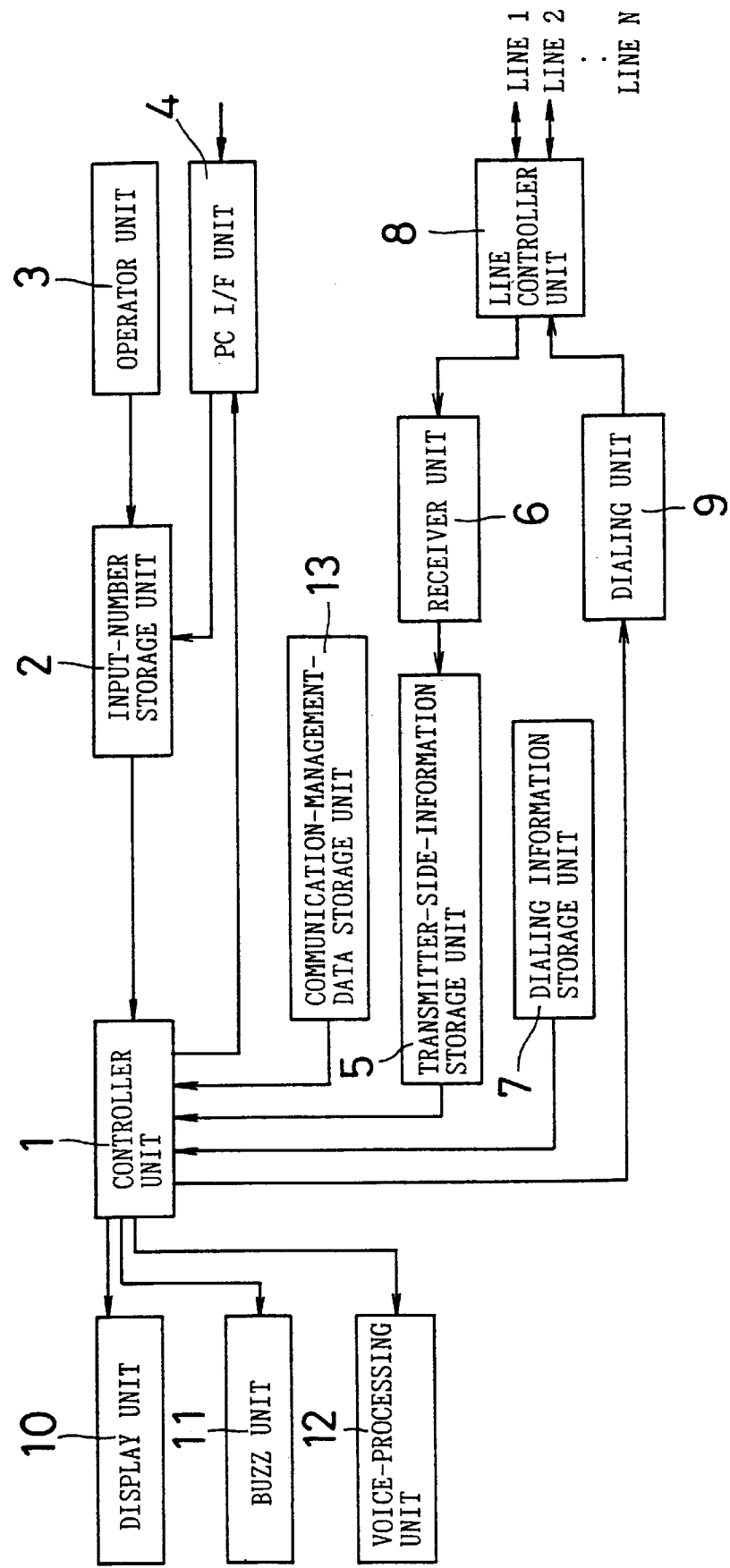
FIG. 1 is a block diagram of the processing-control section of a facsimile apparatus according to the present invention.

Now referring to the drawings, preferred embodiments of the invention are described below.

The facsimile apparatus according to the present invention is equipped with reading means for reading a document image which is to be transmitted to a receiver; output means of printing received data (on a document) on a sheet of paper; means of feeding and forwarding the sheet, etc. in addition to a processing-controller unit which will be described below in detail with reference to FIG. 1.

An embodiment of the invention will now be described with reference to FIG. 1 through FIG. 7.

A control operation according to the invention will be described in 1) through 6) below.

Here, 1) through 6) correspond to FIG. 2 through FIG. 7, respectively.

1) When the operator inputs a telephone number in cases where an operator side-initiated connection has already been established, the number input by the operator is compared with the subscriber number of the other end of the established line each time a digit of the number is input (S201 through S207), and no dialing is performed as long as the compared digits match. In cases where all the counterpart digits of the numbers match, prior establishment of the connection is displayed or is indicated by a voice message, and dialing is not performed (S208 through S210).

When the first mismatching digit is found, dialing of the input telephone number is initiated (S211 and S212).

The objects to be considered in the comparison are only the digits of the telephone numbers, and do not include a pause code and other control codes.

2) When the apparatus attempts to automatically dial a telephone number in cases where an apparatus-initiated connection has been established, the number to be dialed is compared with the subscriber number of the other end of the established line each time a digit of the number is input (S301 through S307), and in cases where all the counterpart digits of the numbers match, the dialing is delayed until the already established connection is disconnected or until a predetermined time elapses after the disconnection (S308 and S309)

When the first mismatching digit is found, the data is transferred to the dialing unit (S310 and S311).

The objects to be considered in the comparison are only the digits of the telephone numbers, and do not include a pause code and other control codes.

3) In cases where the apparatus includes the capability of operating as a data fax modem under control of a personal computer, and an apparatus-initiated connection has been established, when dialing is requested by the personal computer, the data on the subscriber number of the other end of the established line is compared with the data on the number to be dialed which has been received from the personal computer (S401 through S407), and when both data match, no dialing operation is performed, a result code indicating that the line is busy is sent to the personal computer, and the operation is terminated (S408 and S409).

When the first mismatching digit is found, the data is transferred to the dialing unit (S410 and S411).

The objects to be considered in the comparison are only the digits of the telephone numbers, and do not include a pause code and other control codes.

4) When the operator inputs a telephone number in cases where an other end-initiated connection has been established, the data on the number input by the operator is compared with the information on the other end sent from the other end each time a digit of the number is input (S501 through S507), and no dialing operation is performed as long as the compared digits match. In cases where all the counterpart digits of the numbers match, prior establishment of the connection is displayed or is indicated by a voice message, and dialing is not performed (S509 and S510).

When the first mismatching digit is found, dialing of the input telephone number is initiated (S511 and S512).

The objects to be considered in the comparison are only the digits of the telephone numbers, and do not include a pause code and other control codes.

5) When the apparatus attempts to automatically dial a telephone number in cases where an other end-initiated connection has been established, the data on the number to be dialed is compared with the information on the other end sent from the other end each time a digit of the number is input (S601 through S607), and in cases where all the counterpart digits of the numbers match, the dialing is delayed until the already established connection is disconnected or until a predetermined time elapses after the disconnection (S608 and S609).

When the first mismatching digit is found, the data is transferred to the dialing unit (S610 and S611).

The objects to be considered in the comparison are only the digits of the telephone numbers, and do not include a pause code and other control codes.

6) In cases where the apparatus includes the capability of operating as a data fax modem under control of a personal computer, and an other end-initiated connection has been established, when dialing is requested by the personal computer, the information on the other end sent from the other end is compared with the data on the number to be dialed which has been received from the personal computer (S701 through S707), and when both data match, no dialing operation is performed, a result code indicating that the line is busy is sent to the personal computer, and the operation is terminated (S708 and S709).

When the first mismatching digit is found, the data is transferred to the dial unit (S710 and S711).

The objects to be considered in the comparison are only the digits of the telephone numbers, and do not include a pause code and other control codes.

FIG. 1 is a block diagram illustrating a control operation according to the invention, wherein 1 indicates a controller unit, 2 is an input-number storage unit, 3 indicates an operator unit, 4 indicates a personal computer I/F unit, 5 is a transmitter-side information storage unit, 6 indicates a receiver unit, and 7 is a dial-information storage unit.

8 is a line controller unit, 9 is a dialing unit, and 10, 11 and 12 are a display unit, buzz unit and voice-processing unit, respectively. 13 is a communication-management-data storage unit.

The control operation illustrated in FIG. 1 will now be described again with reference to a flow chart related to the drawing.

Figure 2:
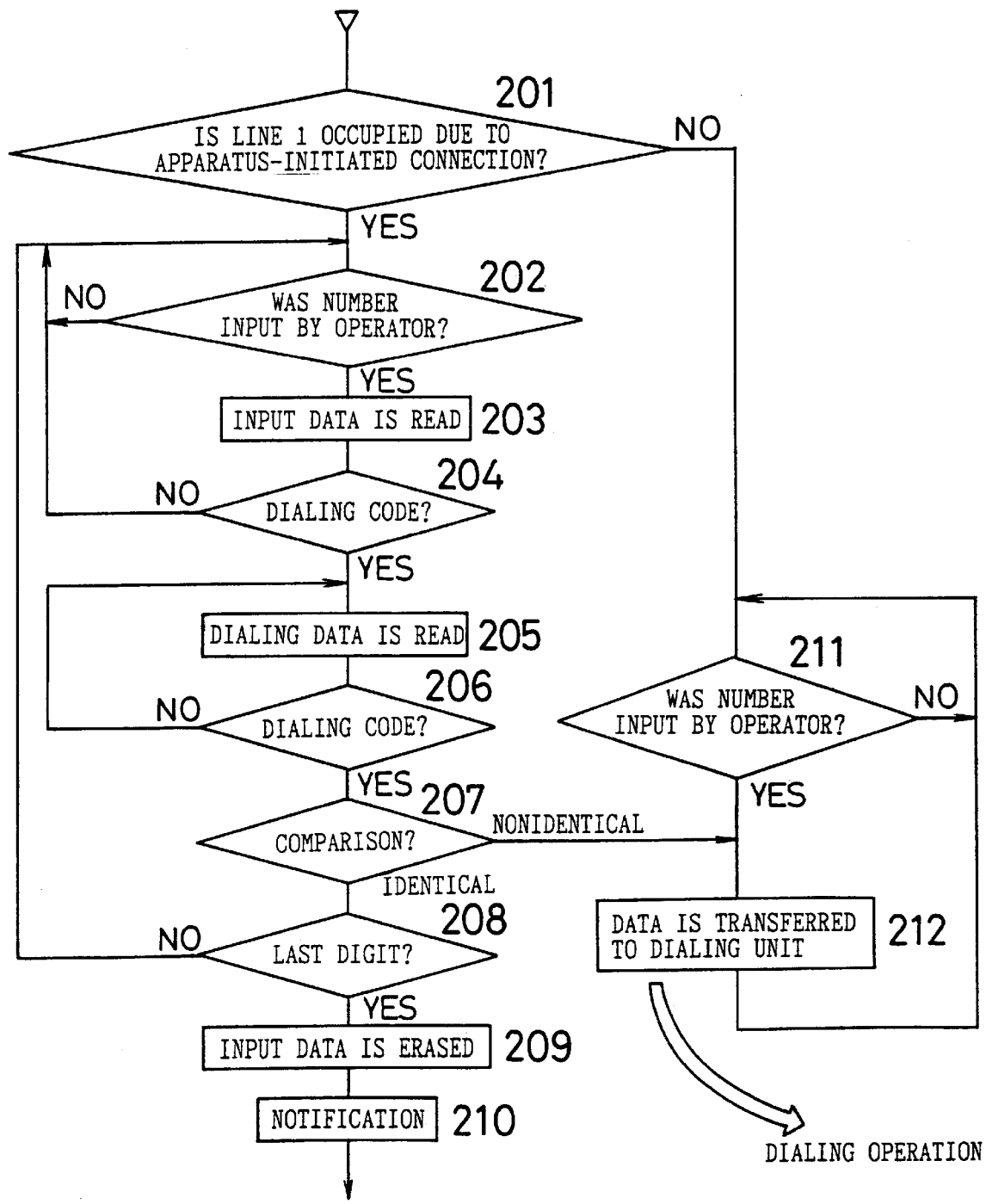
FIG. 2 is a flow chart which illustrates a control operation (first embodiment) of the facsimile apparatus according to the invention.

In the flow chart of FIG. 2, the data on the subscriber number of the receiver connected over line 1 is stored in the dial information storage unit 7 of the apparatus. Here, the data on the number input by the operator with the operator unit 3 is stored in the input-number storage unit 2 on a digit-by-digit basis. The controller unit 1 compares the two data on a digit-by-digit basis starting with the first digits (S201 through S207).

Here, control codes such as a pause code which have no direct relationship with the telephone numbers, when found, are skipped, and the next digit is considered in the comparison. When the controller unit 1 finds the first mismatching digit, on Judging that the destination number is not the same, the data stored in the input-number storage unit is sent to the dialing unit 9 (S212) which in turn issues a command matching the received data to the line controller unit 8, and a signal matching the received command is output to line 2 from the line controller unit 8. Here, the comparison for the data on the number input by the operator is terminated. In cases where the result of the comparison shows that the two data completely match, the controller unit 1 erases the data stored in the input-number storage unit 2, without sending it to the dialing unit 9, and notifies the display unit 10, the buzz unit 11 and the voice-processing unit 12 that the apparatus has already been connected to the receiver, and the respective stations perform their own processing depending on the notification (S208 through S210).

Figure 3:
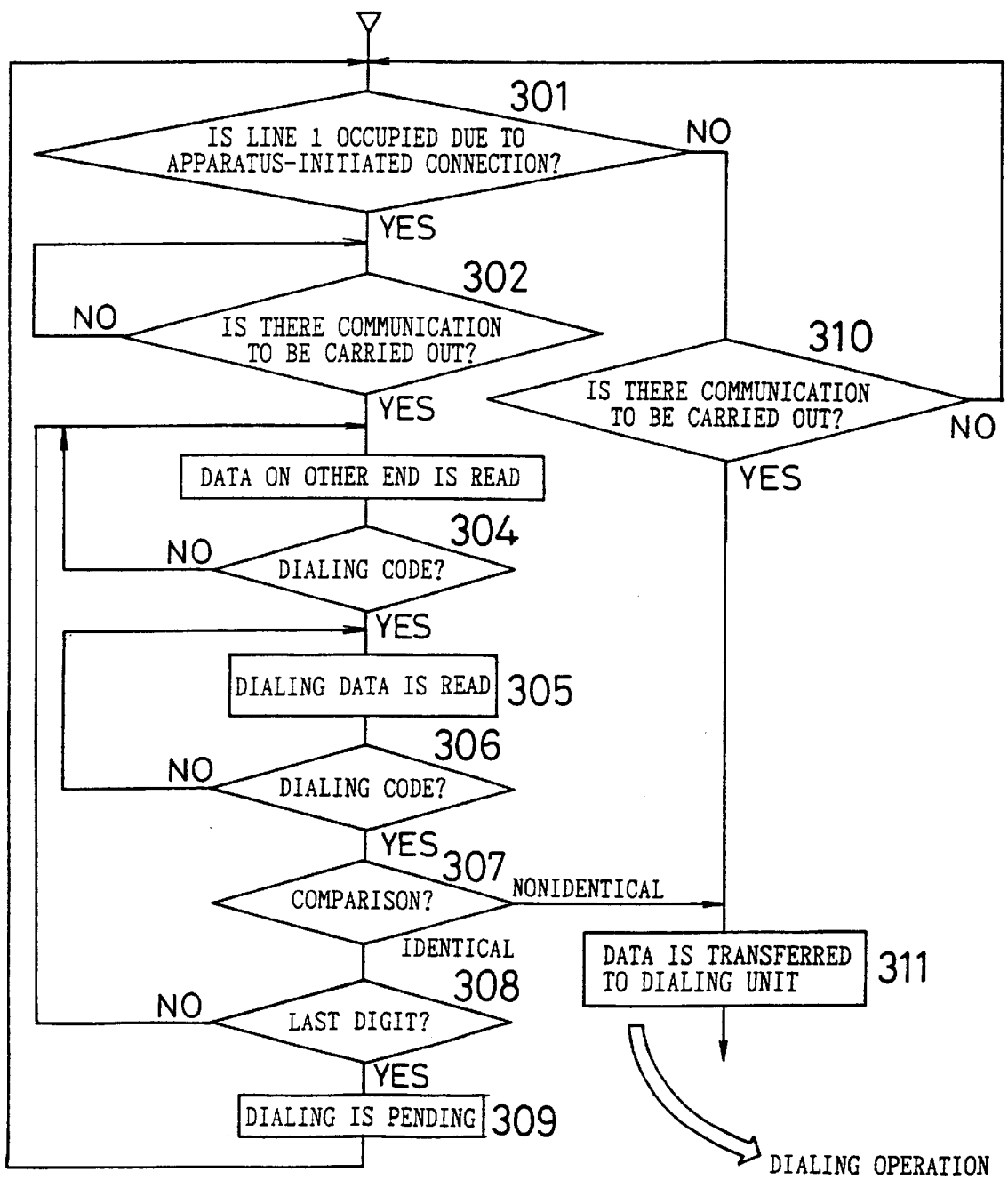
FIG. 3 is a flow chart which illustrates another control operation (second embodiment) of the facsimile apparatus according to the invention.

In the flow chart of FIG. 3, the data on the subscriber number of the receiver connected over line 1 is stored in the dial information storage unit 7 of the apparatus. When the controller unit 1 accesses the communication management data storage unit 13 and finds a communication to be carried out, the data on the destination number of the communication is read from the communication management data storage unit 13 and is compared with the data stored in the dial information storage unit 7 (S301 through S307).

Here, control codes such as a pause code which have no direct relationship with the telephone numbers, when found, are skipped, and the next digit is considered in the comparison. When the controller unit 1 finds the first mismatching digit, on judging that the destination number is not the same, the data on the destination number which is stored in the communication management storage unit 13 is sent to the dial unit 9 (S311) which in turn issues a command matching the received data to the line controller unit 8, and a signal matching the received command is output to line 2 from the line controller unit 8. In cases where the result of the comparison shows that the two data completely match, the controller unit 1 waits until line 1 is freed, without carrying out the communication (S308 through S309).

Figure 4:
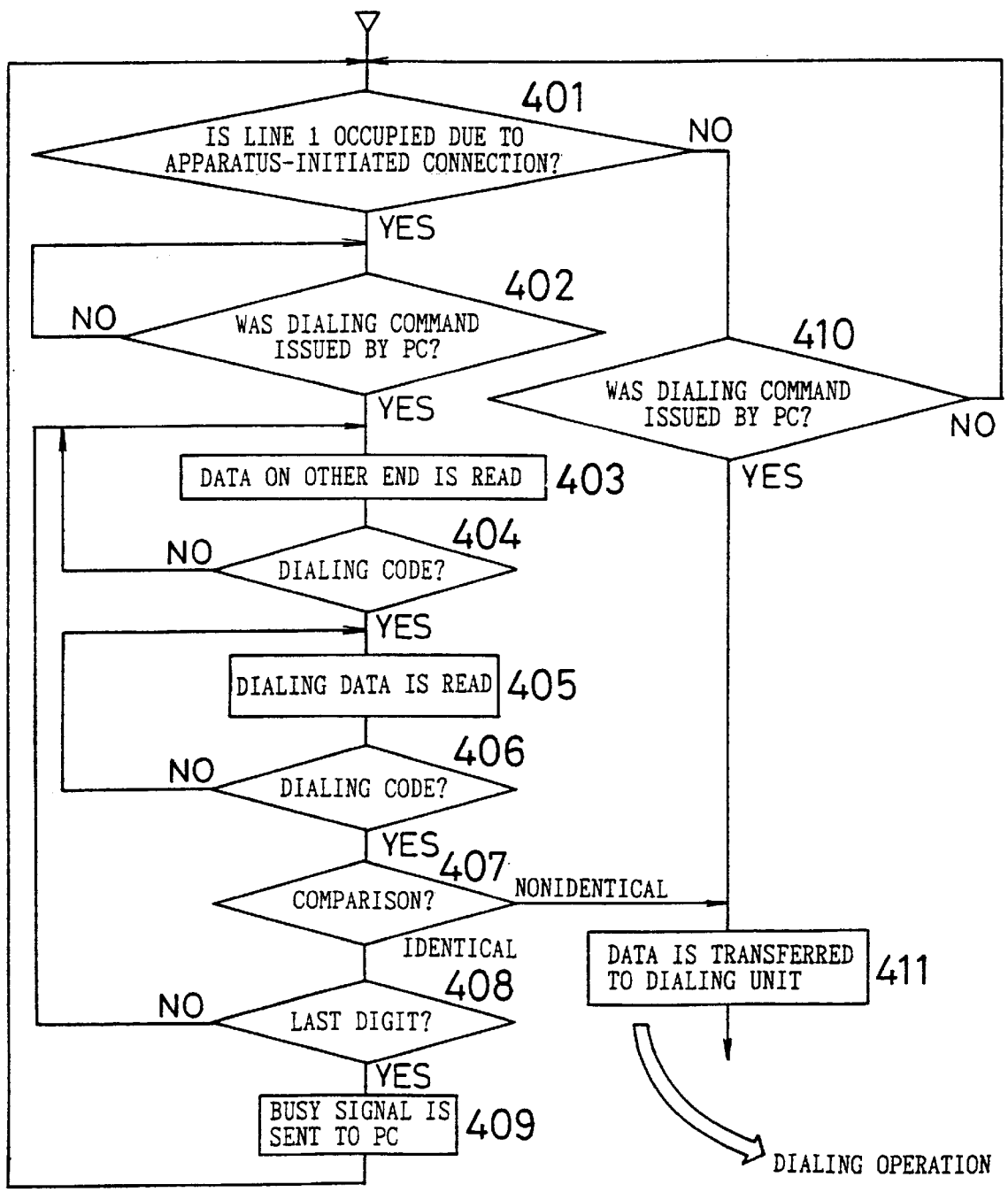
FIG. 4 is a flow chart which illustrates yet another control operation (third embodiment) of the facsimile apparatus according to the invention.

In the flow chart of FIG. 4, the data on the subscriber number of the receiver connected over line 1 is stored in the dial information storage unit 7 of the apparatus. Here, the data on the dial received from the personal computer is stored in the input-number storage unit 2 via the personal computer I/F unit 4. The controller unit 1 compares the data with the data stored in the dial information storage unit 7 (S401 through S407).

Here, control codes such as a pause code which have no direct relationship with the telephone numbers, when found, are skipped, and the next digit is considered in the comparison. When the controller unit 1 finds the first mismatching digit, on judging that the destination number is not the same, the data stored in the input-number storage unit 2 is sent to the dial unit 9 (S411) which in turn issues a command corresponding to received data to the line controller unit 8, and a signal corresponding to the received command is output to line 2 from the line controller unit 8. In cases where the result of the comparison shows that the both data completely match, the controller unit 1 erases the data stored in the input-number storage unit 2, without sending it to the dialing unit 9, and sends a signal indicating that the line is busy to the personal computer via the personal computer I/F unit 4 (S408 through S409).

Figure 5:
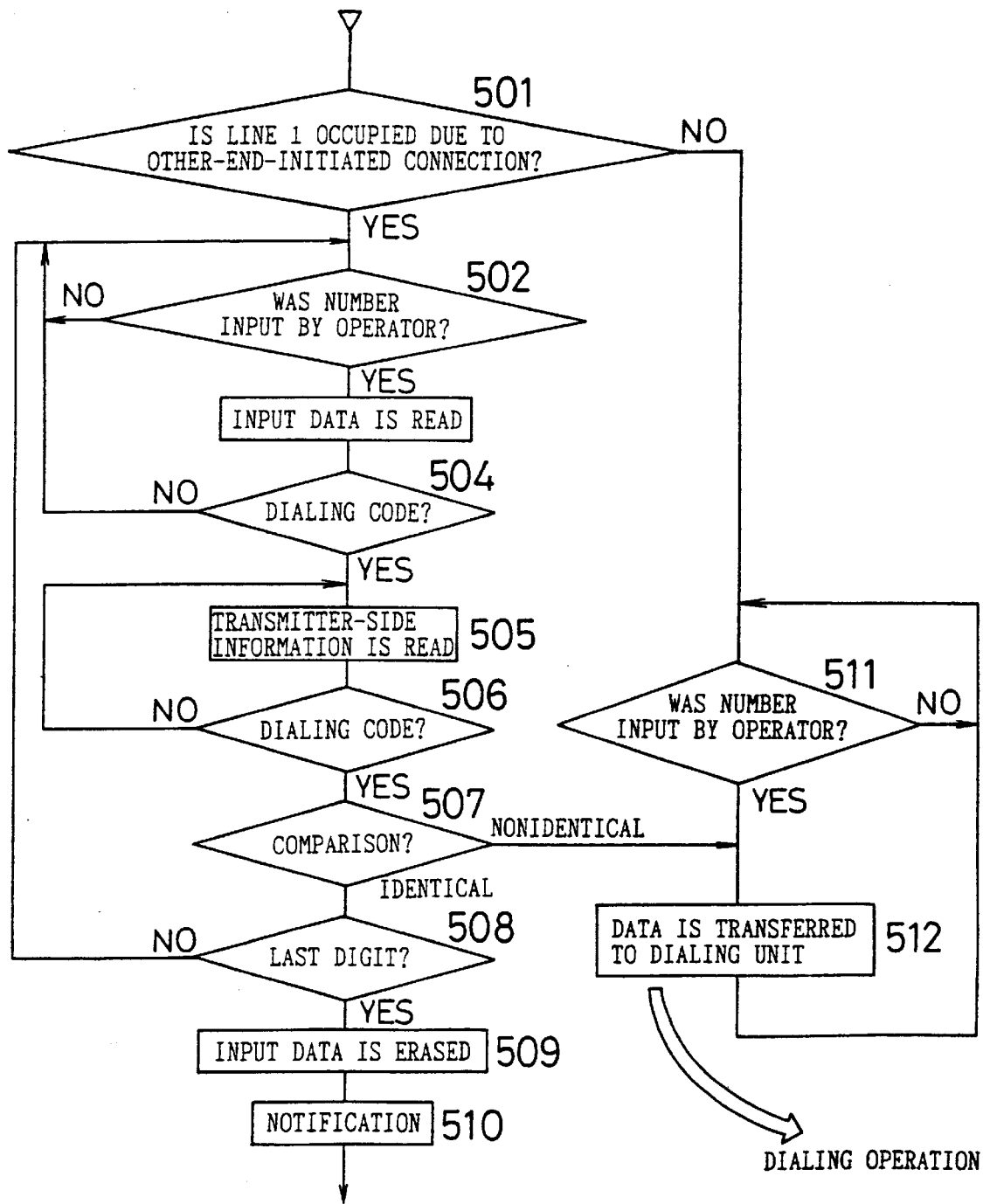
FIG. 5 is a flow chart which illustrates yet another control operation (fourth embodiment) of the facsimile apparatus according to the invention.

In the flow chart of FIG. 5, the information on the other end connected over line 1 which has been initiated by the other end is received from the other end and stored in the transmitter-side information storage unit 5 via the receiver unit 6. Here, the data on the number input by the operator with the operator unit 3 is stored in the input-number storage unit 2 on a digit-by-digit basis. The controller unit 1 compares the two data on a digit-by-digit basis starting with the first digits (S501 through S507).

Here, control codes such as a pause code which have no direct relationship with the telephone numbers, when found, are skipped, and the next digit is considered in the comparison. When the controller unit 1 finds the first mismatching digit, on judging that the destination number is not the same, the data stored in the input-number storage unit 2 is sent to the dialing unit 9 (S511) which in turn issues a command corresponding to the received data to the line controller unit 8, and a signal corresponding to the received command is output to line 2 from the line controller unit 8. No further comparison is made for the data on the number input by the operator. In cases where the result of the comparison shows that the both data completely match, the controller unit 1 erases the data stored in the input-number storage unit 2, without sending it to the dialing unit 9, notifies the display unit 10, the buzz unit 11 and the and the voice-processing unit 12 that the apparatus has already been connected to the receiver, and the respective units perform their own processing depending on the notification (S508 through S510).

Figure 6:
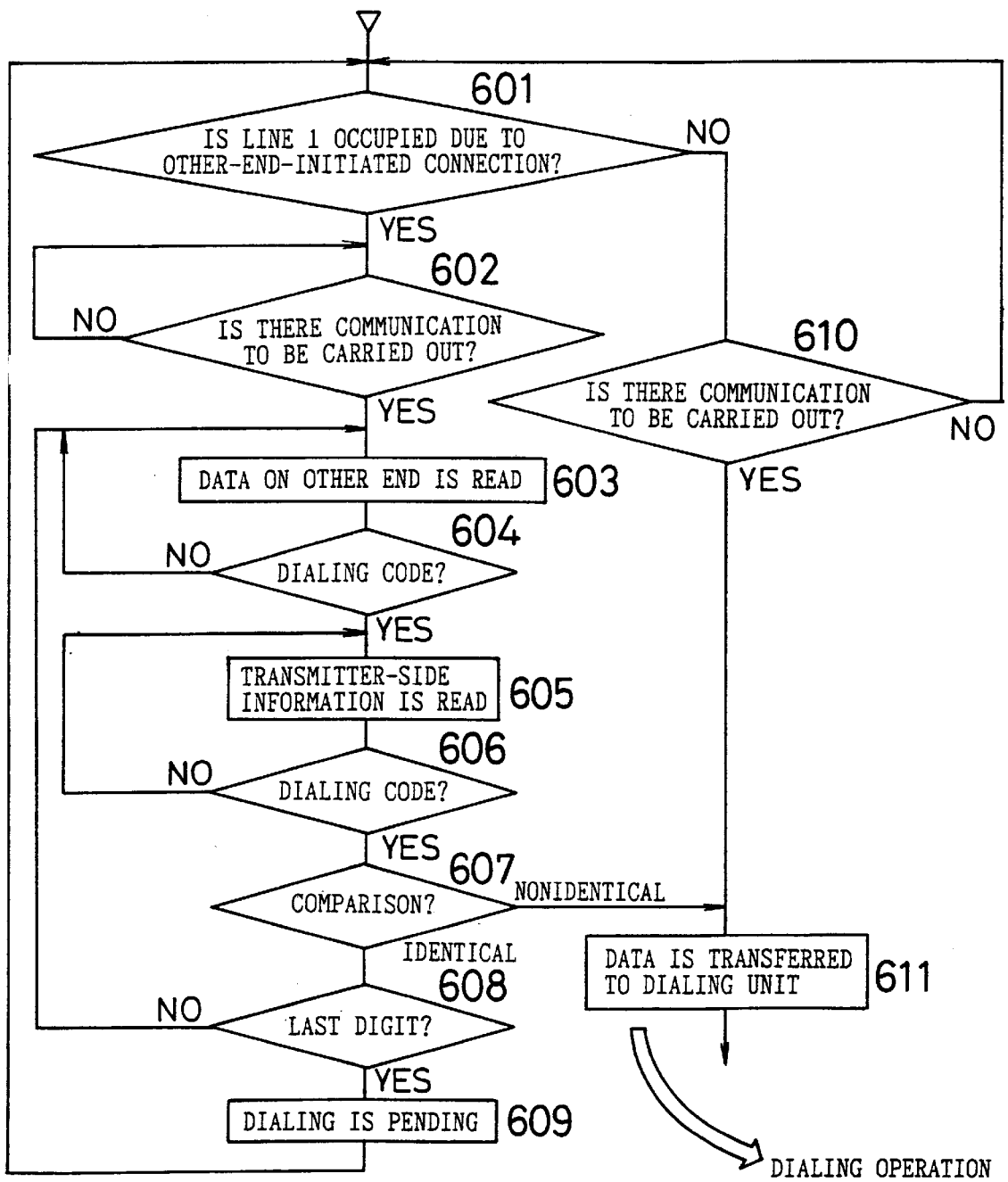
FIG. 6 is a flow chart which illustrates yet another control operation (fifth embodiment) of the facsimile apparatus according to the invention.

In the flow chart of FIG. 6, the information on the other end connected over line 1 which has been initiated by the other end is received from the other end and stored in the transmitter-side information storage unit 5 via the receiver unit 6. When the controller unit 1 accesses the communication management data storage unit 13 and finds a communication to be carried out, the data on the destination number of the communication is read from the communication management data storage unit 13 and is compared with the data stored in the transmitter side-information storage unit 5 (S601 through S607).

Here, control codes such as a pause code which have no direct relationship with the telephone numbers, when found, are skipped, and the next digit is considered in the comparison. When the controller unit 1 finds the first mismatching digit, on Judging that the destination number is not the same, the data on the destination number which is stored in the communication management storage unit 13 is sent to the dialing unit 9 (S611) which in turn issues a command corresponding to the received data to the line controller unit 8, and a signal corresponding to the received command is output to line 2 from the line controller unit 8. In cases where the result of the comparison shows that both data completely match, the controller unit 1 waits until line 1 is freed, without carrying out the communication (S608 through S609).

Figure 7:
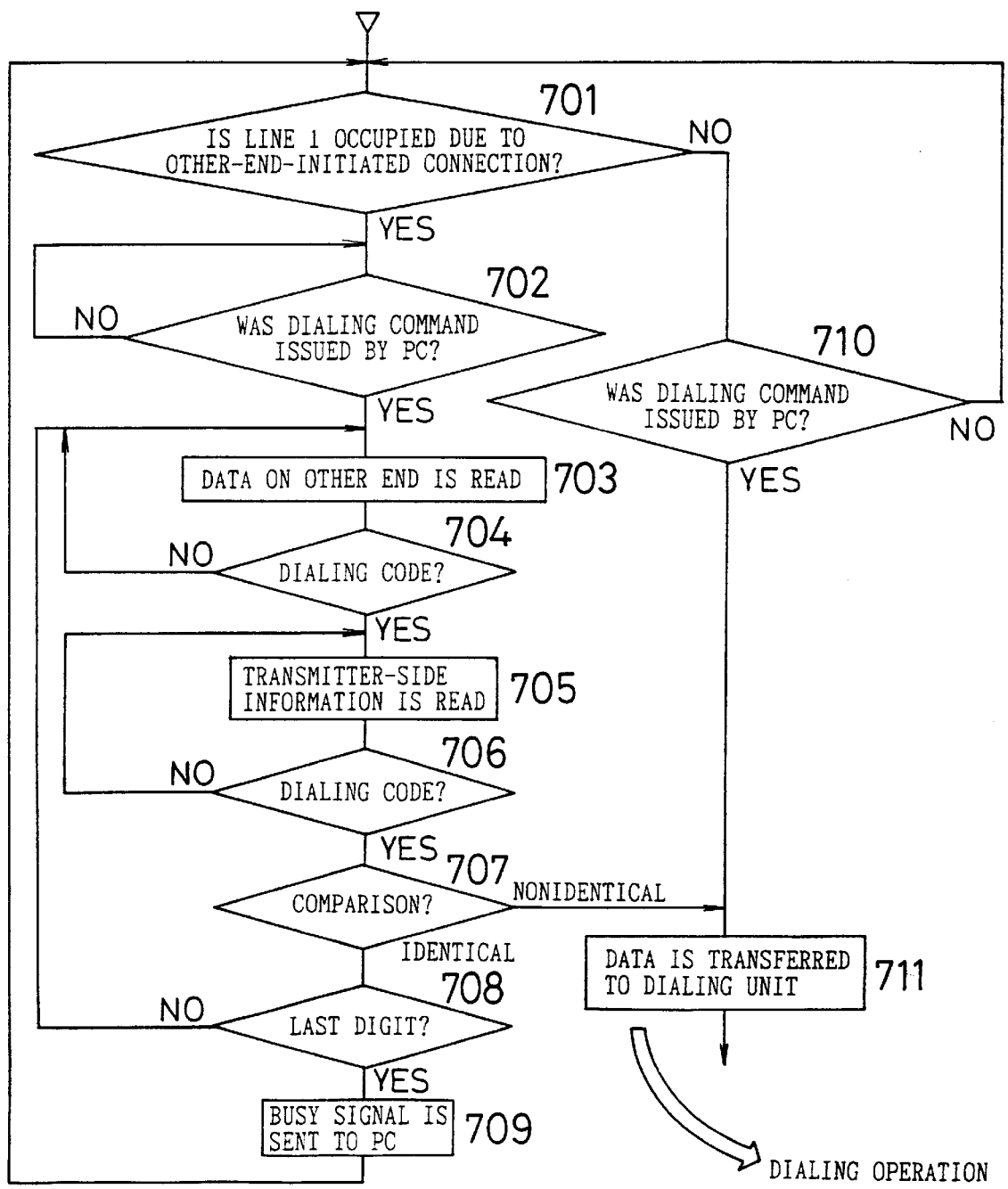
FIG. 7 is a flow chart which illustrates yet another control operation (sixth embodiment) of the facsimile apparatus according to the invention.

In the flow chart of FIG. 7, the information on the other end connected over line 1 which has been initiated by the other end is received from the other end and stored in the transmitter-side information storage unit 5 via the receiver unit 6. Here, the data on the dial received from the personal computer is stored in the input-number storage unit 2 via the personal computer I/F unit 4. The controller unit 1 compares the data with the data stored in the transmitter-side information storage unit 5 (S701 through S707).

Here, control codes such as a pause code which have no direct relationship with the telephone numbers, when found, are skipped, and the next digit is considered in the comparison. When the controller unit 1 finds the first mismatching digit, on judging that the destination number is not the same, the data stored in the input-number storage unit 2 is sent to the dialing unit 9 (S711) which in turn issues a command corresponding to the received data to the line controller unit 8, and a signal corresponding to the received command is output to line 2 from the line controller unit 8. In cases where the result of the comparison shows that the both data completely match, the controller unit 1 erases the data stored in the input-number storage unit 2, without sending it to the dialing unit 9, and sends a signal indicating that the line is busy to the personal computer via the personal computer I/F unit 4 (S708 through S709).

According to the invention, the subscriber number of the other end connected on a first line is compared with the subscriber number which the apparatus is going to dial on a second line, and when the numbers are found to be the same, the result of the comparison is notified to the operator, and the dialing is not performed or delayed until the already established connection is disconnected, thus improving the usability of the apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile apparatus capable of simultaneously being connected to a plurality of lines, which allows dialing by an operator or automatic control by the apparatus over an idle line of the plurality of lines in cases when the apparatus has already been connected to another apparatus, for communication or operation for establishing a communication, by accessing or being accessed from the another apparatus, said facsimile apparatus comprising:

comparison means for comparing a first subscriber number of a currently connected end and a second subscriber number of an end which will be dialed, the comparison means comparing the second subscriber number with the first subscriber number as each digit of the second subscriber number is dialed; and control means for suspending or terminating a dialing operation when the comparison means finds that the first and the second subscriber numbers are identical by suspending the dialing operation until the currently connected communication is terminated or by terminating the dialing operation, and for initiating the dialing operation when a first mismatching digit is found by the comparison means.

2. A facsimile apparatus capable of simultaneously being connected to a plurality of lines, the facsimile apparatus comprising:

a first storage unit storing a first subscriber number of a currently connected line;

a second storage unit storing a second subscriber number of a line to be dialed;

a comparison unit communicating with the first storage unit and the second storage unit, the comparison unit comparing the first subscriber number and the second subscriber number as each digit of the second subscriber number is dialed; and a controller communicating with the comparison unit, the controller suspending or terminating a dialing operation when the comparison unit finds that the first subscriber number and the second subscriber number are identical by suspending the dialing operation until the currently connected line is terminated or by terminating the dialing operation, the controller initiating the dialing operation when a first mismatching digit is found by the comparison unit.

3. A facsimile apparatus according to claim 2, wherein said first storage unit comprises a transmitter-side information storage unit storing an other-end initiated and currently connected number as the first subscriber number.

4. A facsimile apparatus according to claim 2, wherein the second storage unit comprises an input-number storage unit that stores the second subscriber number of the line to be dialed that is input by an operator, the controller comprising structure that erases the second subscriber number stored in the input-number storage unit when the first subscriber number and the second subscriber number are identical, and structure that notifies the operator that the number input is currently connected.

5. A facsimile apparatus according to claim 2, wherein the second storage unit comprises a communication management data storage unit that stores the second subscriber number, and wherein the controller comprises a dial pending unit that waits for disconnection of the line without carrying out the dialing operation when the first subscriber number and the second subscriber number are identical.

6. A facsimile apparatus according to claim 2, wherein the second storage unit comprises an input-number storage unit that stores the second subscriber number received from a personal computer, the controller comprising structure that erases data stored in the input-number storage unit when the first subscriber number and the second subscriber number are identical, and structure that sends a busy response to the personal computer.

7. A facsimile apparatus according to claim 2, wherein said first storage unit comprises a dialing information storage unit storing a previously inputted and currently connected number as the first subscriber number.

8. A facsimile apparatus according to claim 7, wherein said first storage unit further comprises a transmitter-side information storage unit storing an other-end initiated and currently connected number as the first subscriber number.

9. A method of operating a facsimile apparatus capable of simultaneously being connected to a plurality of lines, the method comprising:

comparing a first subscriber number of a currently connected end and a second subscriber number of an end which will be dialed by comparing the second subscriber number with the first subscriber number as each digit of the second subscriber number is dialed;

suspending or terminating a dialing operation when it is determined in the comparing step that the first and the second subscriber numbers are identical by suspending the dialing operation until the currently connected communication is terminated or by terminating the dialing operation; and initiating the dialing operation when a first mismatching digit is found in the comparing step.

10. A method of operating a facsimile apparatus capable of simultaneously being connected to a plurality of lines, the method comprising:

(a) storing a first subscriber number of a currently connected line;

(b) storing a second subscriber number of a line to be dialed;

(c) comparing the first subscriber number and the second subscriber number as each digit of the second subscriber number is dialed;

(d) suspending or terminating a dialing operation when it is determined in the comparing step that the first subscriber number and the second subscriber number are identical by suspending the dialing operation until the currently connected line is terminated or by terminating the dialing operation; and (e) initiating the dialing operation when a first mismatching digit is found in the comparing step.

11. A method according to claim 10, wherein step (a) is practiced by storing an other-end initiated and currently connected number as the first subscriber number.

12. A method according to claim 10, wherein the facsimile apparatus is a data fax modem of a personal computer, and wherein when it is determined in the comparing step that the first subscriber number and the second subscriber number are identical, the method comprises sending a result code indicating that the line is busy to the personal computer.

13. A method according to claim 10, wherein step (a) is practiced by storing a previously inputted and currently connected number as the first subscriber number.

14. A method according to claim 13, wherein step (a) is further practiced by storing an other-end initiated and currently connected number as the first subscriber number.

15. A method according to claim 10, wherein step (d) is practiced by delaying dialing until a predetermined time elapses after the currently connected line is terminated.

16. A method according to claim 10, wherein if the currently connected line is an other-end established connection and it is determined in the comparing step that the first subscriber number and the second subscriber number are identical, step (d) is further practiced by (d1) indicating that prior establishment of the connection has been made.

17. A method according to claim 16, wherein step (d1) is practiced by displaying the indication that prior establishment of the connection has been made.

18. A method according to claim 16, wherein step (d1) is practiced by providing a voice message.

* * * * *